Figure 1:
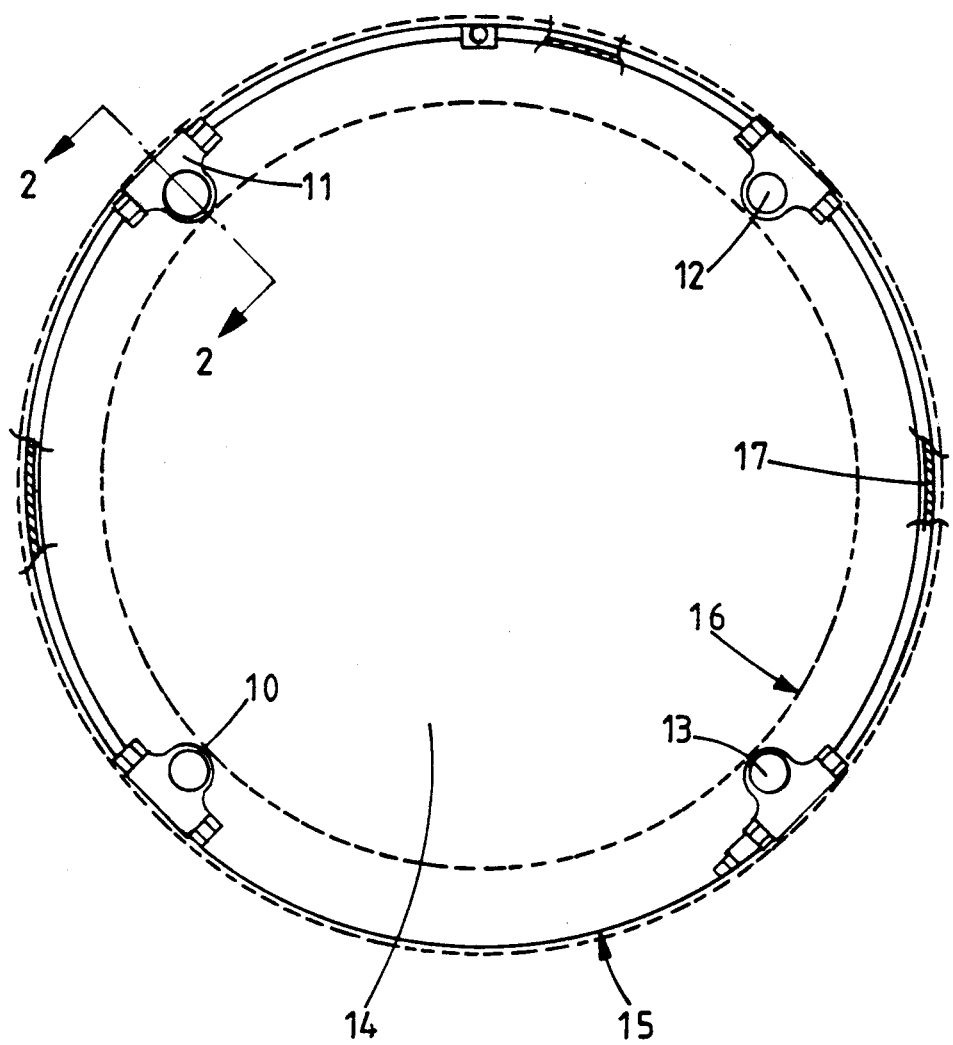

United States Patent [19]

Harvey

[11] Patent Number: 5,174,662
[45] Date of Patent: Dec. 29, 1992

[54] DEVICE FOR APPLYING BRAKING TORQUE TO A SHAFT

[75] Inventor: John H. Harvey, Wolverhampton, England

[73] Assignee: Lucas Industries Public Limited Company, Solihull, England

[21] Appl. No.: 791,901

[22] Filed: Nov. 12, 1991

[30] Foreign Application Priority Data

Nov. 16, 1990 [GB] United Kingdom ............... 9024914

[51] Int. Cl.⁵ ............................................. F16C 17/10
[52] U.S. Cl. ..................................... 384/611; 384/517
[58] Field of Search ............... 384/611, 613, 517, 518, 384/563, 620

[56]  References Cited

U.S. PATENT DOCUMENTS 4,727,762  3/1988  Hayashi ............................. 384/517
4,892,423  1/1990  Takahashi et al. ................ 384/613
4,997,292  3/1991  Klimkovsky et al. ............. 384/613
5,067,827  11/1991  Bokel ................................. 384/517

Primary Examiner—Lenard A. Footland
Attorney, Agent, or Firm—Dvorak and Traub

[57] ABSTRACT

A shaft is supported in a housing by single row, deep-groove, radial ball bearings having diametral clearances which will permit axial displacement between their inner and outer races, abutment faces which are located with respect to the shaft and housing respectively engage the inner and outer races respectively of the bearings so as to take up play which results from the diametral clearances, abutment elements which engage the respective inner races can coact with the housing as a result of increase in the aforesaid axial displacements, to provide a braking effect between the shaft and the housing.

6 Claims, 3 Drawing Sheets

DEVICE FOR APPLYING BRAKING TORQUE TO A SHAFT

This invention relates to a device for applying a braking torque to a rotary shaft in the event of an axial load thereon which exceeds a predetermined level.

In particular a device according to the invention is intended for use in conjunction with a shaft which forms part of a linear to rotary converter, such that an increase in torque load on the shaft will result in a corresponding increase in axial load on the shaft.

In a particular embodiment the device of the invention may form part of an actuator for operating a variable-area nozzle or for deploying and stowing the thrust reversers of a gas turbine engine. Such an actuator is shown in U.S. Pat. No. 3,621,763 and includes a threaded rod which engages a thread on an output element of the actuator. The rod therefore rotates as the output element moves linearly. The threaded rod is drivingly connected to similar rods in other actuators for a single thrust reversing element, and the arrangement is intended to ensure that all of the actuators move in unison. The driving connection is usually in the form of worm and wheel gearing associated with each actuator, and a flexible cable which interconnects the worm elements of the respective actuators.

The torque load on the threaded rods and the cable is, in normal use, very small. In the event of seizure of an actuator, or of a part driven thereby, a considerably higher torque will be applied from the threaded rods of the remaining actuators to the seized actuator, by way of the aforesaid driving connection. It is an object of the invention to limit the torque which can be applied to the driving connection in the event of seizure, and thereby to permit a reduction in the dimensions and weight of that connection.

In the aforesaid particular embodiment the threaded rod, adjacent a driving connection to corresponding rods in other actuators, is supported in a housing by at least one deep groove journal ball bearing whose inner and outer races are given an initial relative axial displacement to take up axial clearance in the bearing in a direction of relative movement between said races resulting from an axial load on said threaded rod. An axial load on said rod tending to increase said relative displacement will result in elastic deformation of the components of the bearing. At a predetermined level of that elastic deformation a first part mounted on the rod for rotation therewith engages a second part fixed to the housing, that engagement applying a braking torque to the threaded rod.

According to the invention there is provided a device for applying a braking torque to a shaft in response to a predetermined level of axial load on said shaft, comprising a housing, a single row, deep-groove, radial ball bearing whose inner race is fixed to said shaft and whose outer race engages said housing, said bearing having a diametral clearance which will permit an axial displacement between its inner and outer races, said housing having an abutment face which maintains the outer race of said bearing in an initial position which is axially displaced relative to the inner race, by an amount sufficient to take up axial play which results from said diametral clearance, and an abutment element which is axially fixed with respect to said inner race and can coact with a fixed part on said housing as a result of increase of said axial displacement of said inner race.

In a preferred embodiment said fixed part on said housing is said outer race.

A particular embodiment includes first and second ones of said bearings whose inner races are mounted on said shaft at a fixed axial spacing and whose outer races engage said housing, said housing having two abutment faces which maintain the outer races of said first and second bearings in initial positions which are axially displaced in respective opposite directions relative to their inner races by amounts sufficient to take up axial play resulting from said diametral clearances, and first and second abutment elements which are fixed relative to respective ones of said inner races and can respectively coact with fixed parts on said housing as a result of increase of axial displacement of respective ones of said inner races from said initial positions.

Figure 2:
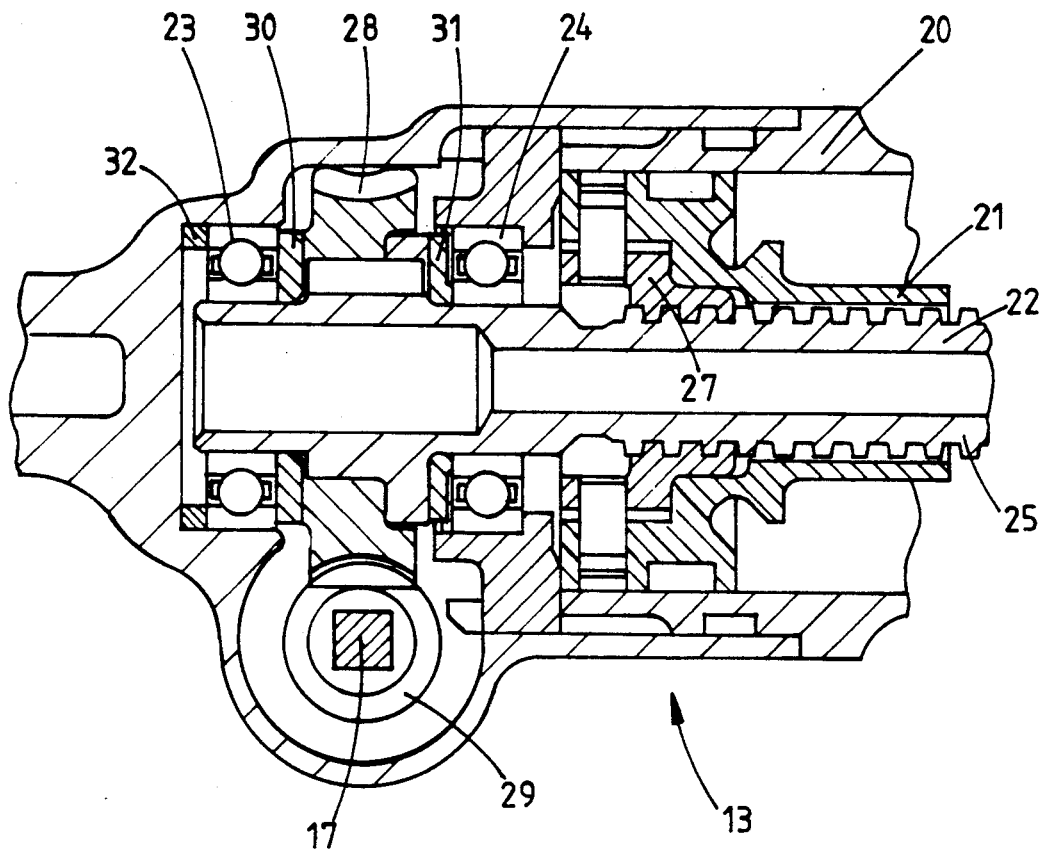
Figure 3:
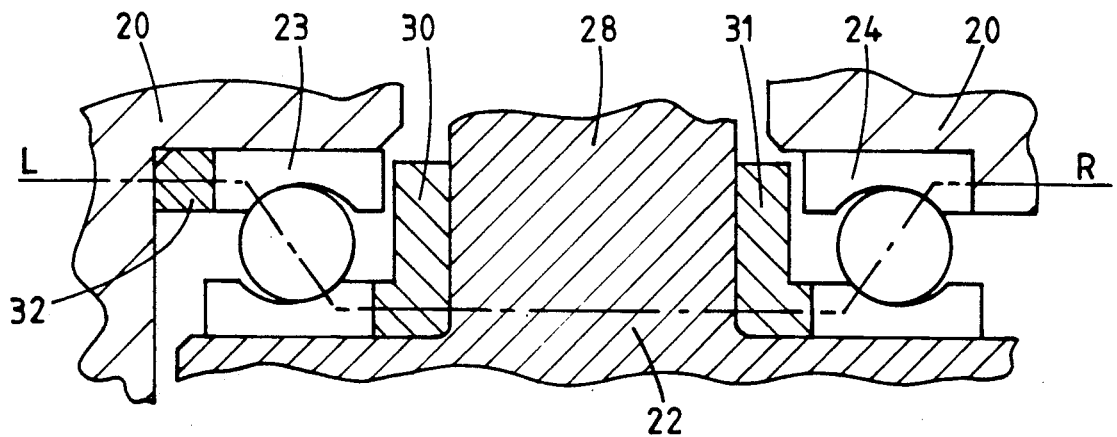
Figure 4:
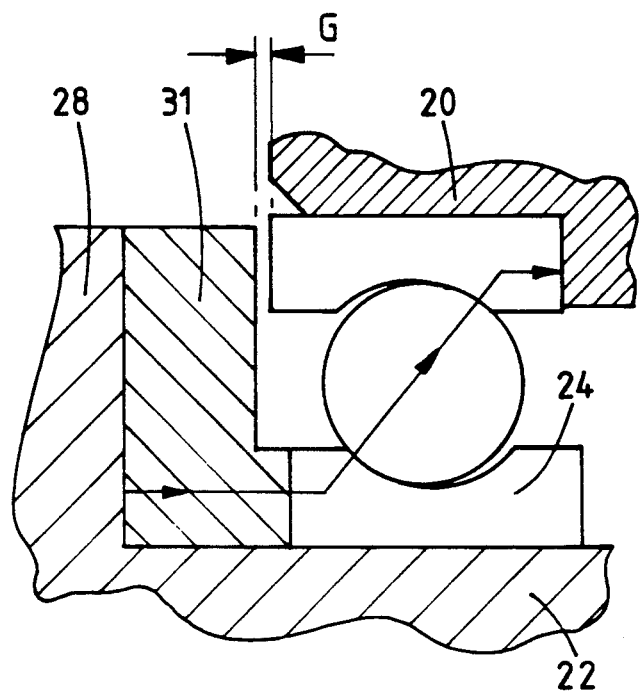
Figure 5:
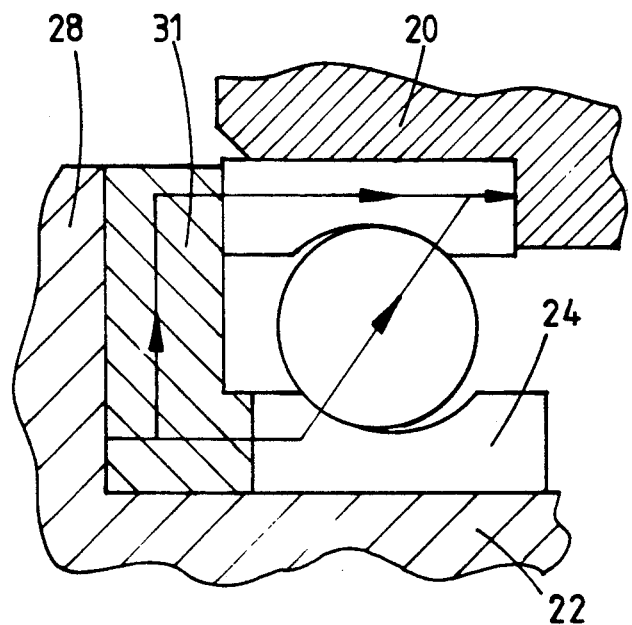

An embodiment of the invention will now be described by way of example only, and with reference to the accompanying drawings in which:

FIG. 1 shows, diagrammatically, the arrangement of a plurality of linear actuators about the axis of a gas turbine engine, FIG. 2 is a longitudinal section on line 2—2 in FIG. 1, through one end of an actuator, FIG. 3 is a view to an enlarged scale of part of FIG. 2, showing initial take-up of axial clearance in the bearings, and FIGS. 4 and 5 show, diagrammatically, one of the bearings with and without axial loading.

As shown in FIG. 1 four identical linear actuators 10-13 are arranged equi-angularly about the axis of a gas turbine engine 14, so as to effect axial movement of a sleeve 15 surrounding the jet pipe 16 of the engine 14. The sleeve 15 may form part of a thrust reverser system, as described in U.S. Pat. No. 3,621,763, or may form part of a variable-area nozzle system.

The actuators 10-13 are drivingly coupled, in a manner described below in more detail, by a flexible drive device 17 which ensures that the actuators operate in unison. FIG. 2 shows one end of the linear actuator 13 which has a housing 20 within which an output element 21 is axially movable by fluid pressure. A rod 22 is journalled in the housing 20 and is restrained against axial movement by means of ball bearings 23, 24. The rod 22 extends within a bore of the output element 21 and has a high efficiency thread 25 which engages a complementary thread in a nut 27 which is secured to the element 21. A toothed wheel 28 is secured to the rod 22 for rotation therewith and engages a worm 29 from which the flexible drive 17 extends to a corresponding worm in the respective actuators 10, 12, 13. The actuators are therefore constrained to operate in unison.

The bearings 23, 24 are single row, radial, deep-groove bearings with substantial amounts of diametral clearance between the balls and the tracks in the bearing races. The bearings 23, 24 are thus able to carry a substantial axial load. The inner races of the bearings 23, 24 are located axially of the wheel 18 by respective annular elements 30, 31. A packing piece or shim assembly 32 between the outer race of the bearing 23 and the housing 20 is dimensioned to take up axial play in the bearings 23, 24 resulting from their diametral clearance, as shown in FIG. 3. The packing piece 32 may be dimensioned so that in addition to taking up axial play it also applies a pre-load to the bearings 23, 24 which results in an initial elastic distortion of the bearing elements. It will be seen that the inner races of the bearings 23, 24 engage projecting abutments on the respective elements 30, 31. The load line L-R shows the line of action of axial loads on the rod 22 and wheel 28, in the left and right directions respectively, to parts of the housing 20 in the absence of axial overload on the rod 22. The elements 30, 31 are dimensioned so as to provide gaps G (FIG. 4) of 0.051 mm to 0.127 mm between the outer races of the bearings 23, 24 and adjacent faces of the elements 30, 31. In normal operation the torque load on the rod 22 and flexible drive 17, and the axial load on the rod 22 are very small. The axial load path is therefore as shown in FIG. 3, and to a larger scale in FIG. 4.

If during operation one of the actuators, for example the actuator 10, or a part driven thereby, should seize, the remaining actuators 11-13 will continue to move against the torsional stiffness of the flexible drive 17. The torque in the drive 17 will be reacted at the seized actuator 10 and will be the sum of the torques from the unseized actuators, and therefore considerably higher than that during normal operation. Considering the effect on actuator 13, the increased torque in the drive 17 will result in the rod 22 being urged by the output element 21 in the selected direction of movement of the latter. If that movement was to the right as viewed in FIG. 2, the inner race of the bearing 24 will be urged rightwards, as shown in FIG. 5, resulting in elastic deformation of the bearing 24 until the element 31 engages the outer race of that bearing to apply a braking torque to the rod 22. A substantial proportion of the torque which would otherwise be applied by the rod 22 to the flexible drive 17 is thereby absorbed by this braking torque.

Preferably the bearings 23, 24 are subjected to an axial pre-load by means of the shim assembly 32, and the level of braking torque obtained thereby increased. The shim assembly 32 and the axial dimensions of the elements 30, 31 may be varied as required to provide a desired pre-load.

The above effect is also obtained within the actuators 11 and 12, so that the total torque applied to the flexible drive 17 is greatly reduced, and the cross section thereof may be reduced, with a consequent weight saving.

It will be understood that though the invention has been described in detail with reference to a system for axial movement of a sleeve on a gas turbine engine, it is equally applicable to any arrangement in which a critical axial load is required to result in application of braking torque to a rotatable shaft.

Each of the bearings 23,24 is such that the inner race has a greater axial dimension than the outer race, that an axial backlash of 0.023 mm exists between the inner and outer races, and that with a maximum amount of displacement to take up that backlash, projection of an end of the inner race which results from the aforesaid displacement will not exceed 0.30 mm. Additionally, the materials of each bearing 23,24 are such that after the aforesaid backlash has been taken up, its subseqent elastic axial deformation under an axial load of 4.5 Newtons will be at least 0.13 mm.

I claim:

1. A device for applying a braking torque to a shaft in response to a predetermined level of axial load on said shaft, comprising a housing, a single-row, deep-groove, radial ball bearing whose inner race is fixed to said shaft and whose outer race engages said housing, said bearing having a diametral clearance which will permit an axial displacement between its inner and outer races, said housing having an abutment face which maintains the outer race of said bearing in an intitial position which is axially displaced relative to the inner race by an amount which is at least sufficient to take up axial play resulting from said diametral clearance, and an abutment element which is axially fixed with respect to said inner race and can coact with a fixed part on said housing as a result of increase of said axial displacement of said inner race.

2. A device as claimed in claim 1 in which said abutment element can coact with said fixed part on the housing by way said outer race.

3. A device as claimed in claim 2 in which said axial displacement is sufficient to preload said bearing so as to result in elastic distortion thereof.

4. A device as claimed in claim 1 which includes first and second ones of said bearings, the inner races of said bearings being mounted on said shaft at a fixed axial spacing and the outer races of said bearings being located with respect to said housing, said housing having two abutment faces which maintain said outer races in initial positions which are axially displaced in respective opposite directions relative to their respective inner races by amounts which are at least sufficient to take up axial play resulting from said diametral clearances, and first and second abutment elements which are fixed relative to respective ones of said inner races and can respectively coact with fixed parts on said housing as a result of increase of axial displacement of respective ones of said inner races from their intitial positions.

5. A device as claimed in claim 4 in which said axial displacements are sufficient to preload said bearings so as to result in elastic distortion thereof.

6. A device as claimed in claim 1 in which said axial displacement is sufficient to preload said bearing so as to result in elestic distortion thereof.

* * * * *